(12) United States Patent  
Snyder

(10) Patent No.: US 8,152,419 B1
(45) Date of Patent: Apr. 10, 2012

(54) TUBULAR MEMBER NOTCHING SYSTEM AND METHOD

(76) Inventor: Holly R Snyder, Medford, OR (US)

( * ) Notice: Subject to any disclaimer, the term of this patent is extended or adjusted under 35 U.S.C. 154(b) by 806 days.

(21) Appl. No.: 12/315,134

(22) Filed: Nov. 25, 2008

(51) Int. Cl.
*B23B 47/28* (2006.01)

(52) U.S. Cl. .................. 408/105; 408/110; 408/115 R; 408/89

(58) Field of Classification Search .......... 408/89, 408/1 R, 97–98, 103–105, 108, 110–112, 408/115 R; *B23B 47/28*
See application file for complete search history.

(56) References Cited

U.S. PATENT DOCUMENTS

| | | | |
|---|---|---|---|
| 2,746,125 A | | 5/1956 | Cuny |
| 2,953,045 A | * | 9/1960 | Carles ........................ 408/110 |
| 3,333,488 A | * | 8/1967 | De Witt ....................... 408/130 |
| 3,420,124 A | | 1/1969 | Trevathan |
| 3,626,513 A | * | 12/1971 | Pytlak ........................ 408/115 R |
| 4,123,189 A | | 10/1978 | Ferlise et al. |
| 4,562,760 A | | 1/1986 | Kinsley |
| 5,377,397 A | | 1/1995 | Yu et al. |
| 5,775,856 A | * | 7/1998 | Woodard ..................... 408/103 |
| 5,797,708 A | * | 8/1998 | Bencic ....................... 408/112 |
| 5,800,099 A | | 9/1998 | Cooper |
| 7,125,206 B2 | | 10/2006 | Turner |
| 7,607,870 B2 | * | 10/2009 | Hughes, Jr. ..................... 408/88 |
| 2008/0107490 A1 | | 5/2008 | Hughes |
| 2009/0022559 A1 | * | 1/2009 | Hughes, Jr. ................... 408/103 |

FOREIGN PATENT DOCUMENTS

| | | | | |
|---|---|---|---|---|
| BR | 9605197 A | * | 7/1998 |
| CH | 310900 A | * | 1/1956 |
| EP | 329068 A1 | * | 8/1989 |
| JP | 60141417 A | * | 7/1985 |
| JP | 07266117 A | * | 10/1995 |
| JP | 09001498 A | * | 1/1997 |

OTHER PUBLICATIONS

Machine translation from the EPO website of CH 310900, one page, printed Jan. 26, 2012.*
Katz, Dies See, JMR Tube Notcher Review, web article, Sep. 1, 2006.
JD Squaring Inc., Tube Benders, web article, 2006.
Van Sant Enterprises, Inc., JMR High Capacity Tube & Pipe Notcher, online catalog; 2006.

* cited by examiner

*Primary Examiner* — Daniel Howell
(74) *Attorney, Agent, or Firm* — Jerry Haynes Law

(57) ABSTRACT

A tubular member notching system includes a system frame, a clamp jaw assembly carried by the system frame, a jaw actuation assembly carried by the system frame and engaging the clamp jaw assembly, a pivoting swing arm assembly positioned generally alongside the system frame adjacent to the clamp jaw assembly and an arbor housing assembly carried by the pivoting swing arm assembly.

19 Claims, 14 Drawing Sheets

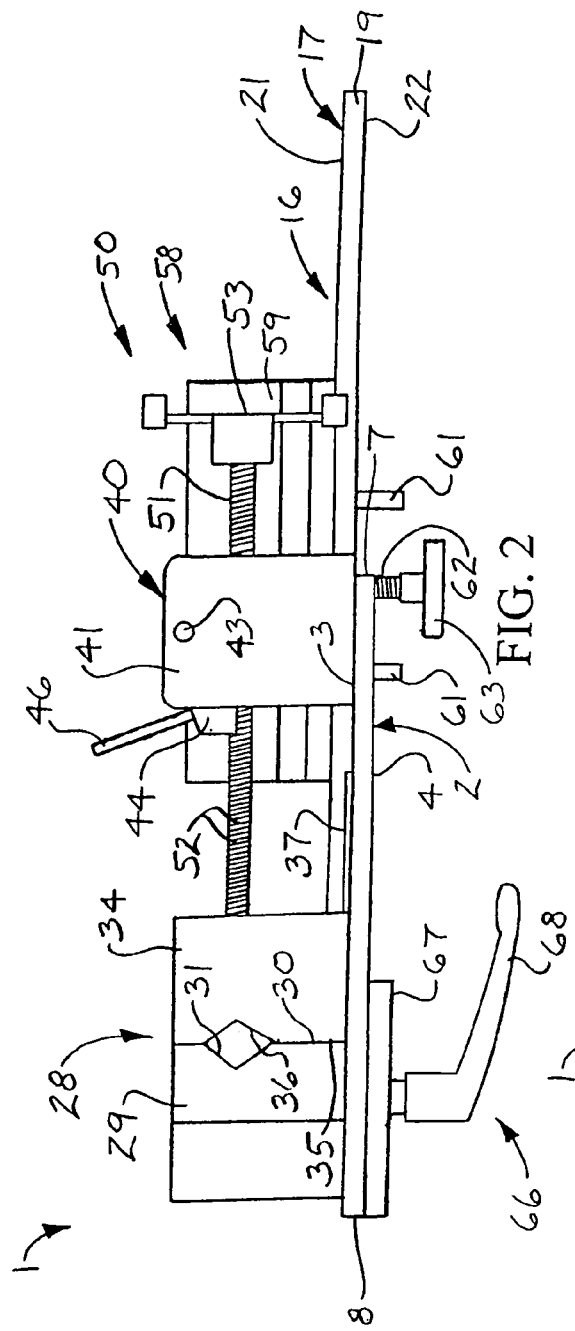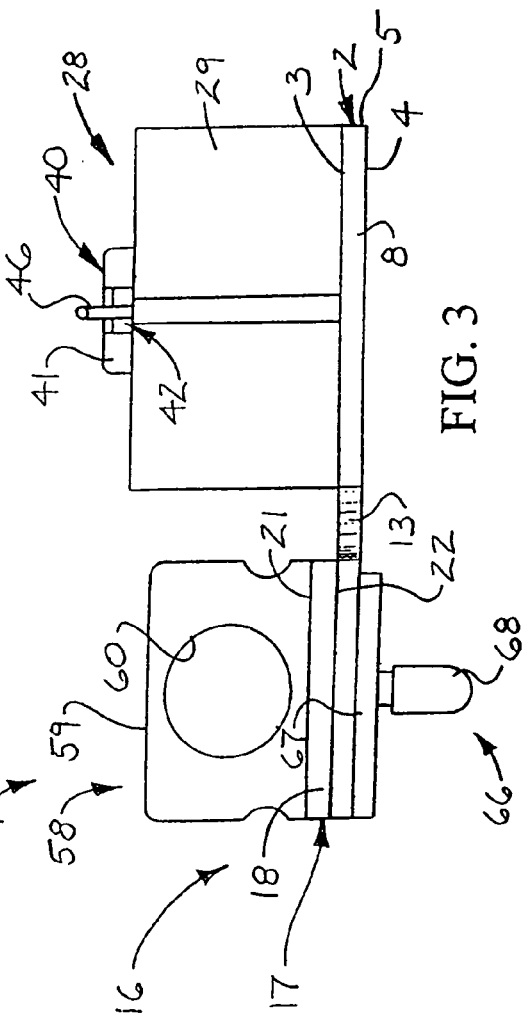

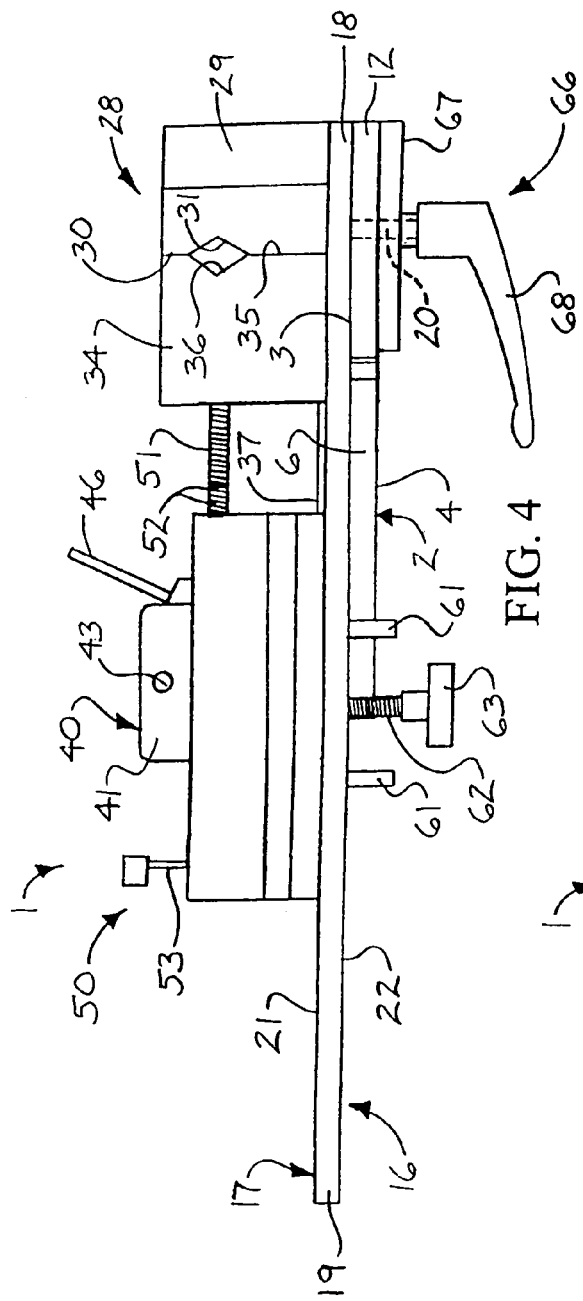
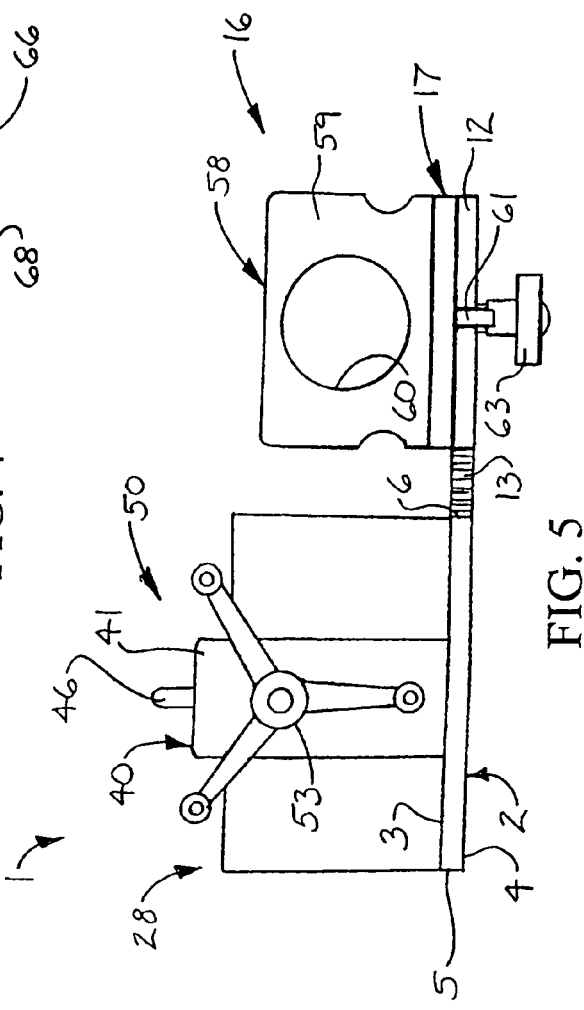
FIG. 4
FIG. 5

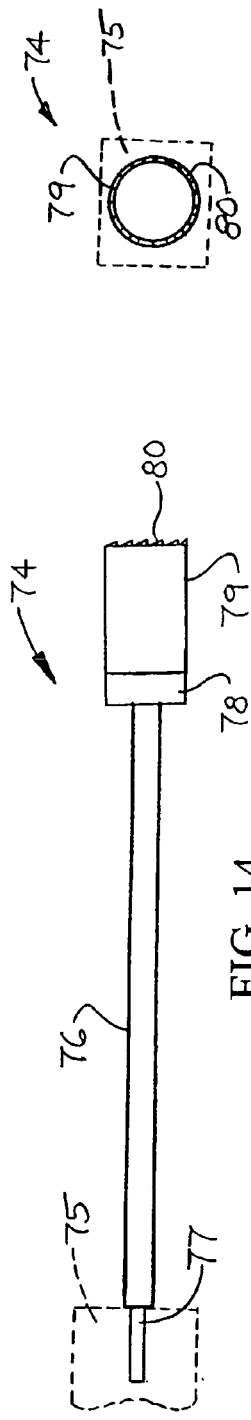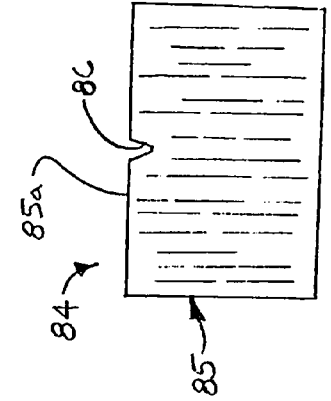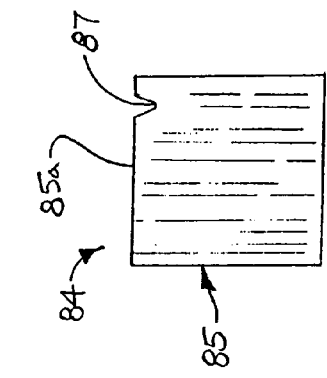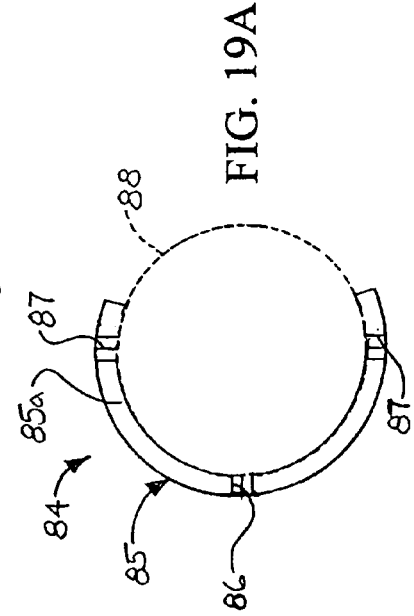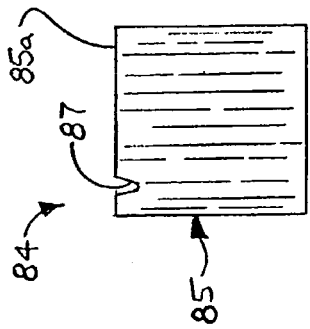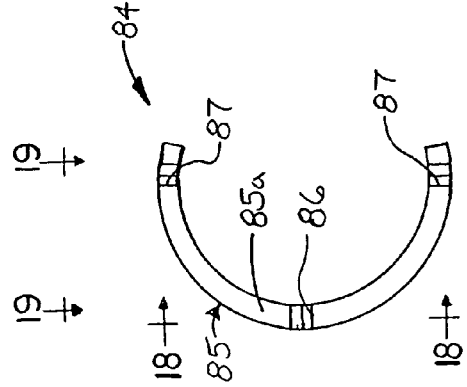

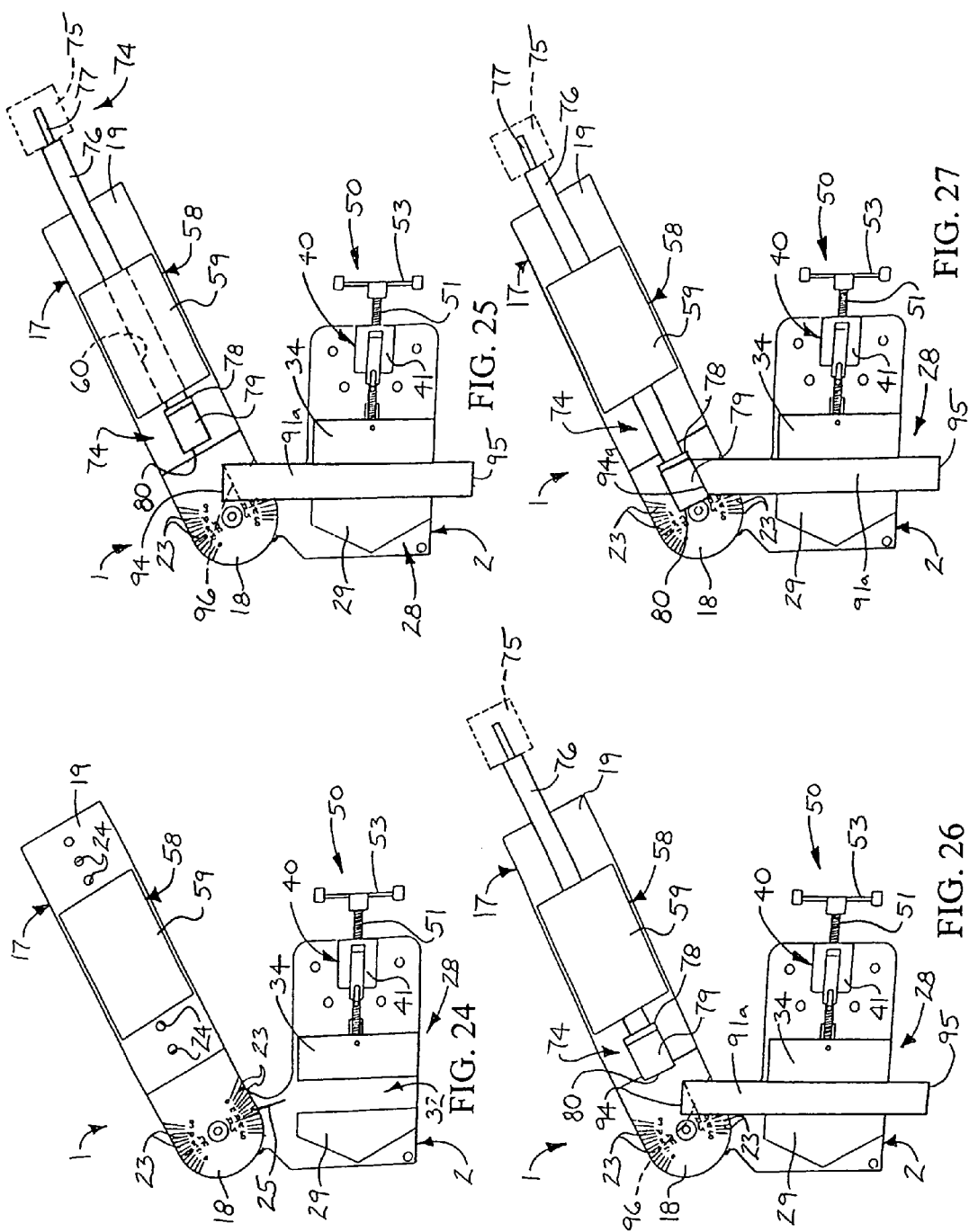

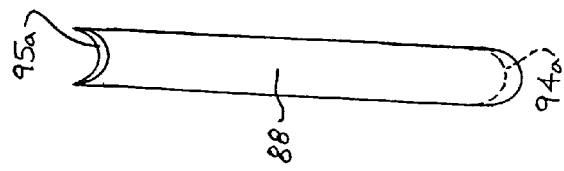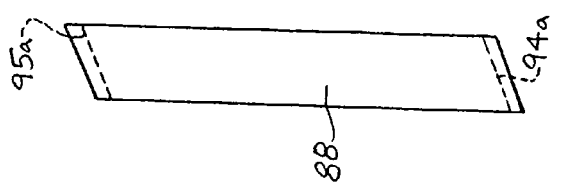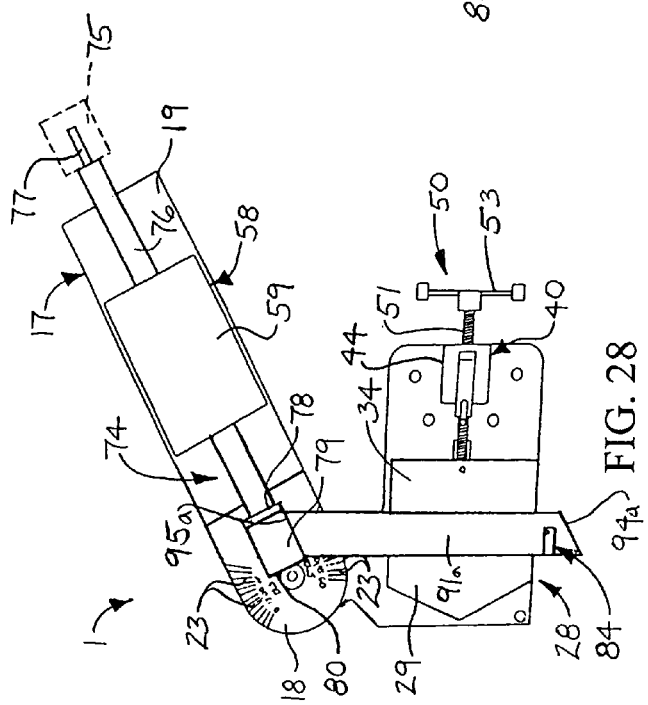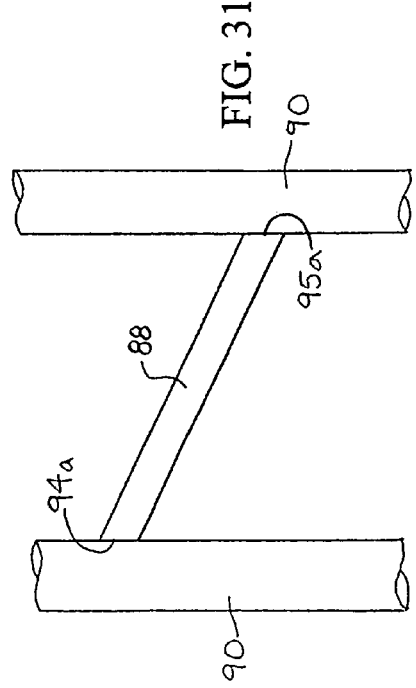

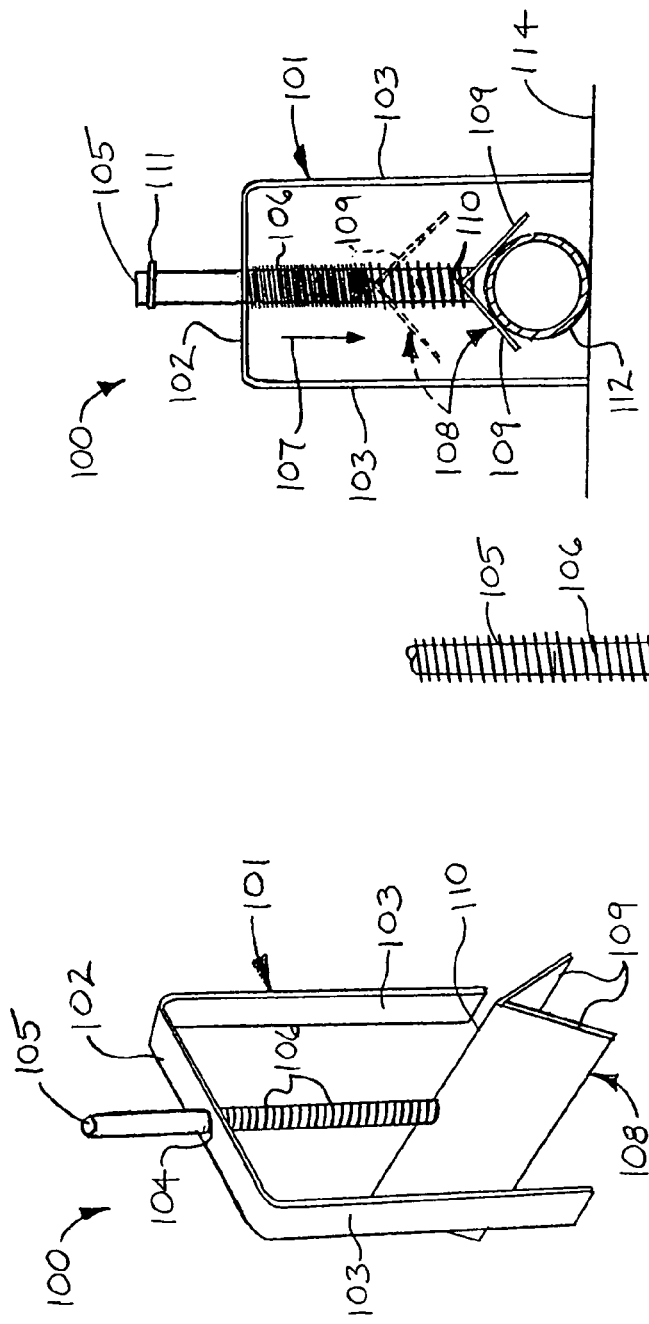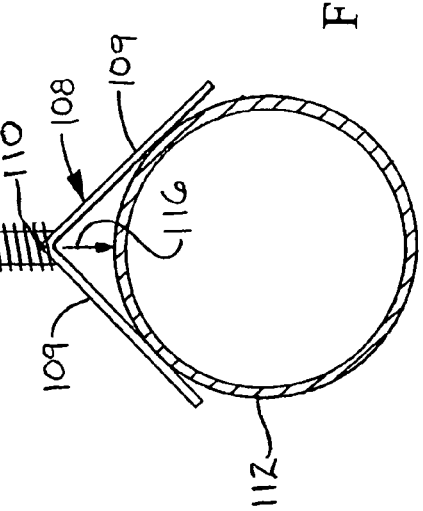

TUBULAR MEMBER NOTCHING SYSTEM AND METHOD

TECHNICAL FIELD

The present disclosure generally relates to devices for cutting notches in tubular members such as tubes and pipes. More particularly, the present disclosure relates to a pipe notching system which facilitates the accurate and expeditious cutting of notches having various angles in either or both ends of a tubular member.

BACKGROUND

In tube or pipe fabrication methods, it is often necessary to cut a notch in one or both ends of a tubular member. For example, in some applications, a tubular connecting member may extend between a pair of spaced-apart tubular side members. Accordingly, a notch which matches the contour of each side member is cut in each end of the connecting member to achieve a congruent fit between that end of the connecting member and the corresponding side member. The notch in each end of the connecting member is cut at an angle which depends on the angle of the connecting member with respect to each side member. Using conventional notch-cutting methods, it may be difficult to cut the notches in the connecting member in an expeditious and accurate manner.

Therefore, a pipe notching system which facilitates the accurate and expeditious cutting of notches having various angles in either or both ends of a tubular member is needed.

SUMMARY

The present disclosure is generally directed to a tubular member notching system. An illustrative embodiment of the tubular member notching system includes a system frame, a clamp jaw assembly carried by the system frame, a jaw actuation assembly carried by the system frame and engaging the clamp jaw assembly, a pivoting swing arm assembly positioned generally alongside the system frame adjacent to the clamp jaw assembly and an arbor housing assembly carried by the pivoting swing arm assembly.

BRIEF DESCRIPTION OF THE DRAWINGS

The disclosure will now be made, by way of example, with reference to the accompanying drawings, in which:

FIG. 2 is a side view, taken along viewing lines 2-2 in FIG. 1, of an illustrative embodiment of the tubular member notching system;

FIG. 3 is an end view, taken along section lines 3-3 in FIG. 1, of an illustrative embodiment of the tubular member notching system;

FIG. 4 is a side view, taken along viewing lines 4-4 in FIG. 1, of an illustrative embodiment of the tubular member notching system;

FIG. 5 is an end view, taken along section lines 5-5 in FIG. 1, of an illustrative embodiment of the tubular member notching system;

FIG. 14 is a side view of an illustrative holesaw assembly which is suitable for implementation of an illustrative embodiment of the tubular member notching system;

FIG. 15 is a front view of the holesaw assembly;

FIG. 16 is a top view of an illustrative centerline indication collar which can be used to indicate the centerline of a tubular member implementation of an illustrative embodiment of the tubular member notching system;

FIG. 17 is a side view, taken along viewing lines 17-17 in FIG. 16, of the centerline indication collar;

FIG. 18 is a front view, taken along viewing lines 18-18 in FIG. 16, of the centerline indication collar;

FIG. 19 is a side view, taken along viewing lines 19-19 in FIG. 16, of the centerline indication collar;

FIG. 19A is a top view of the centerline indication collar, snap-fitted on a tubular member (shown in phantom) with notches in the collar indicating various centerlines on the tubular member;

FIGS. 24-28 are top views, respectively, of an illustrative embodiment of the tubular member notching system, more particularly illustrating sequential cutting of angled notches in the respective ends of the tubular connecting member in one exemplary implementation of the system;

FIG. 29 is a side view of the tubular connecting member with angled notches cut in the respective ends thereof;

FIG. 30 is a front view of the tubular connecting member with angled notches cut in the respective ends thereof;

FIG. 31 is a front view of the tubular side members illustrated in FIGS. 20-22, with the tubular connecting member extending between the tubular side members and the angled notched ends of the tubular connecting member attached to the respective tubular side members;

FIG. 32 is a front perspective view of an illustrative embodiment of a centerline locating device which is suitable for locating a centerline of a tubular member;

FIG. 33 is a front view of the centerline locating device, positioned against a tubular member;

FIG. 34 is a front view of an engaging member and lead screw elements of the centerline locating device in locating the centerline of a tubular member;

DETAILED DESCRIPTION

Figure 1:
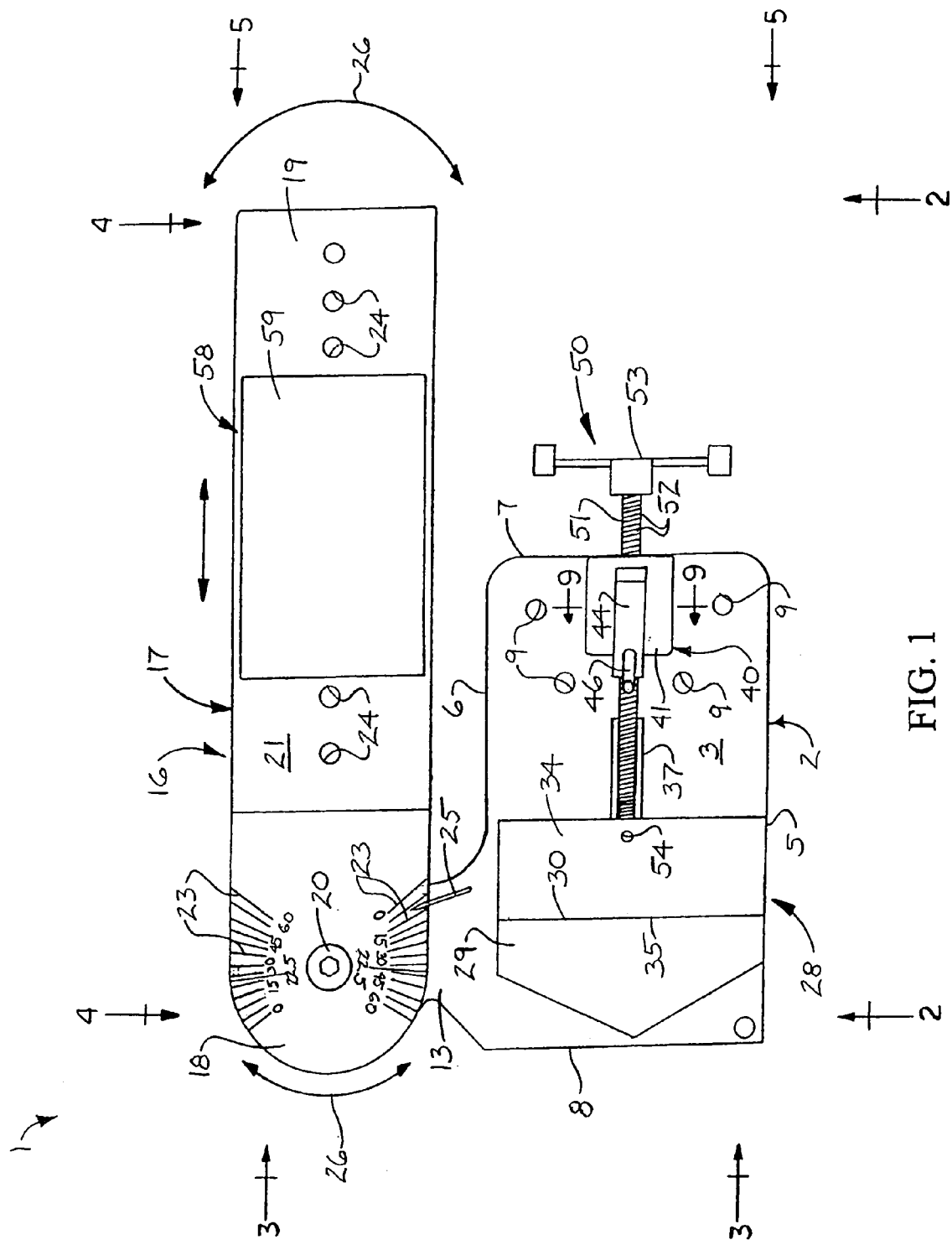
FIG. 1 is top view of an illustrative embodiment of the tubular member notching system.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the invention and are not intended to limit the scope of the invention which is defined by the claims. Furthermore, there is no intention to be bound by any expressed or implied theory presented in the preceding technical field, background, brief summary or the following detailed description.

Referring initially to FIGS. 1-13 of the drawings, an illustrative embodiment of the tubular member notching system, hereinafter system, is generally indicated by reference numeral 1 in FIGS. 1-6. The system 1 includes a system frame 2. In some embodiments, the system frame 2 may be a generally elongated, rectangular frame plate which may be aluminum, steel or other suitable metal or material. The system frame 2 includes a generally planar upper frame surface 3, a lower frame surface 4, an outer side edge 5, an inner side edge 6, a rear edge 7 and a front edge 8. Fastener openings 9 may extend through the system frame 2 in various locations for purposes which will be hereinafter described.

As illustrated in FIGS. 3-6, a swing arm mount base 12, which may be generally circular, extends from the system frame 2. As particularly illustrated in the bottom view of FIG. 6, in some embodiments, a base attachment arm 13 may extend from the inner side edge 6 of the system frame 2, generally adjacent to the front edge 8. The swing arm mount base 12 may extend from the base attachment arm 13.

A swing arm assembly 16 is pivotally mounted on the swing arm mount base 12. The swing arm assembly 16 may include a generally elongated swing arm 17 having a proximal end portion 18 which is pivotally attached to the swing arm mount base 12, such as in a manner which will be hereinafter described, and a distal end portion 19 which is spaced-apart from the proximal end portion 18. The swing arm 17 may additionally include an upper arm surface 21 and a lower arm surface 22. As illustrated in FIG. 1, in some embodiments multiple angle markings 23 may be engraved or otherwise provided on the upper arm surface 21 at the proximal end portion 18 of the swing arm 17. A degree indicator 25 may be provided on the system frame 2, or on the base attachment arm 13 which connects the swing arm mount base 12 to the system frame 2 as illustrated in FIG. 1. The degree indicator 25 indicates the angle of the swing arm 17 with respect to the longitudinal axis of the system frame 2 by pointing at the appropriate angle marking 23 on the proximal end portion 18 of the swing arm 17.

The proximal end portion 18 of the swing arm 17 may be pivotally attached to the swing arm mount base 12 using any suitable attachment technique which is known by those skilled in the art. In some embodiments, a hex-headed swing arm attachment bolt 20 may extend through registering bolt openings (not illustrated) provided in the proximal end portion 18 of the swing arm 17 and in the swing arm mount base 12, respectively. Accordingly, as indicated by the arrows 26 in FIG. 1, the swing arm 17 is capable of pivoting about the swing arm attachment bolt 20 to selected angles with respect to the longitudinal axis of the system frame 2. The swing arm 17 may be capable of pivoting 180 degrees about the swing arm attachment bolt 20.

As further illustrated in each of FIGS. 2-6, in some embodiments the swing arm assembly 16 may include a swing arm locking assembly 66 which facilitates locking of the swing arm 17 at a selected angle with respect to the longitudinal axis of the system frame 2. The swing arm locking assembly 66 may include a generally cylindrical arm lock disk 67, through which extends a central bolt opening (not illustrated). As illustrated in FIG. 4, the swing arm attachment bolt 20 may further extend through the central bolt opening of the arm lock disk 67. A generally elongated arm lock handle 68 may threadably engage the swing arm attachment bolt 20. Accordingly, the arm lock handle 68 may be partially unthreaded on the arm attachment bolt 20 to loosen engagement of the arm lock disk 67 with the lower surface of the swing arm mount base 12. This facilitates free pivoting of the swing arm 17 with respect to the swing arm mount base 12. Conversely, the arm lock handle 68 may be threaded on the arm attachment bolt 20 and against the arm lock disk 67 to tighten the arm lock disk 67 against the lower surface of the swing arm mount base 12 and secure the swing arm 17 at the selected angle with respect to the longitudinal axis of the system frame 2.

Figure 13:
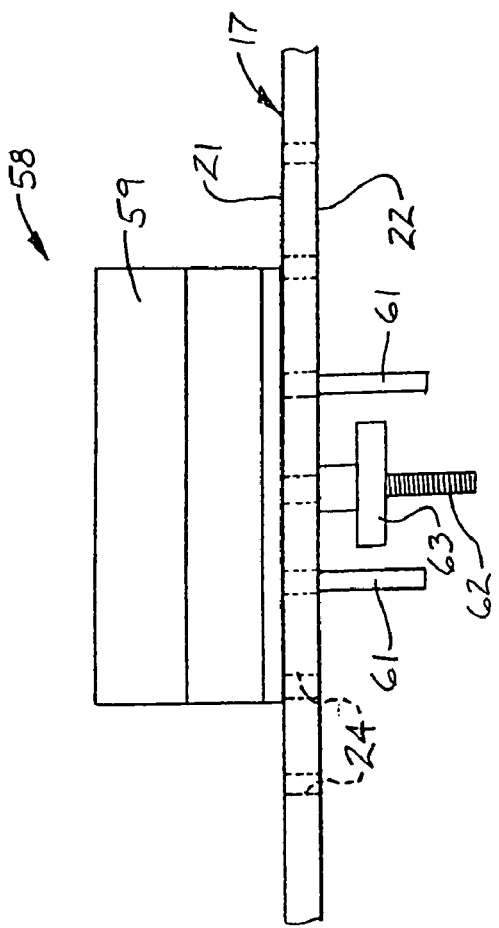
FIG. 13 is a side view of the arbor housing assembly, assembled on a swing arm of the tubular member notching system.
Figure 12:
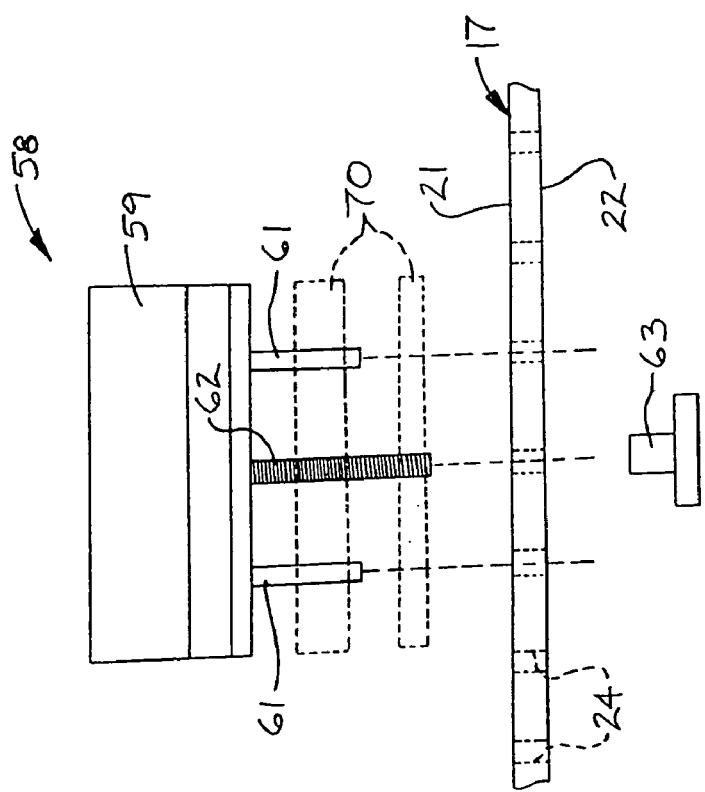
FIG. 12 an exploded side view illustrating attachment of an arbor housing assembly to a swing arm of an illustrative embodiment of the tubular member notching system.

An arbor housing assembly 58 is provided on the swing arm 17 of the swing arm assembly 16. The arbor housing assembly 58 may include an arbor housing 59 through which extends an arbor bore 60, as illustrated in FIGS. 3 and 5. The arbor housing 59 of the arbor housing assembly 58 may be attached to the swing arm 17 of the swing arm assembly 16 according to any suitable technique which is known by those skilled in the art. As illustrated in FIGS. 12 and 13, in some embodiments an elongated, threaded arbor housing mount bolt 62 may extend downwardly from the arbor housing 59. Multiple arbor housing mount openings 24 may extend through the swing arm 17. The arbor housing mount openings 24 may be disposed at spaced-apart intervals with respect to each other along the longitudinal axis of the swing arm 17. Accordingly, the arbor housing mount bolt 62 may be extended through a selected one of the arbor housing mount openings 24, as illustrated in FIGS. 12 and 13. An arbor housing attachment knob 63 may be threaded on the arbor housing mount bolt 62 and against the lower arm surface 22 of the swing arm 17 to secure the arbor housing 59 with respect to the swing arm 17. In some embodiments, a pair of spaced-apart arbor housing guide pegs 61 may extend from the arbor housing 59 on respective sides of the arbor housing mount bolt 62. The arbor housing guide pegs 61 may be extended through the respective arbor housing mount openings 24 which lie on respective sides of the arbor housing mount opening 24 through which the arbor housing mount bolt 62 extends. The arbor housing guide pegs 61 serve to stabilize the arbor housing 59 with respect to the swing arm 17.

As illustrated in FIGS. 1-5, a clamp jaw assembly 28 is provided on the system frame 2. The clamp jaw assembly 28 may include a stationary jaw 29 which may be disposed generally adjacent to the front edge 8 of the system frame 2. A movable jaw 34 is provided on the system frame 2 generally adjacent to the stationary jaw 29. The movable jaw 34 may be rendered movable on the system frame 2 according to any suitable technique which is known by those skilled in the art. As illustrated in FIGS. 1, 2, 7 and 8, in some embodiments, a jaw track 37 may be provided on the upper frame surface 3 of the system frame 2. The movable jaw 34 may include a track slot (not illustrated) which interlocks with the jaw track 37 to slidably mount the movable jaw 34 on the system frame 2 such that the movable jaw 34 can be selectively away from and toward and against stationary jaw 29, as indicated by the arrow 33 illustrated in FIGS. 7 and 8, such as in a manner which will be hereinafter described.

Figure 7:
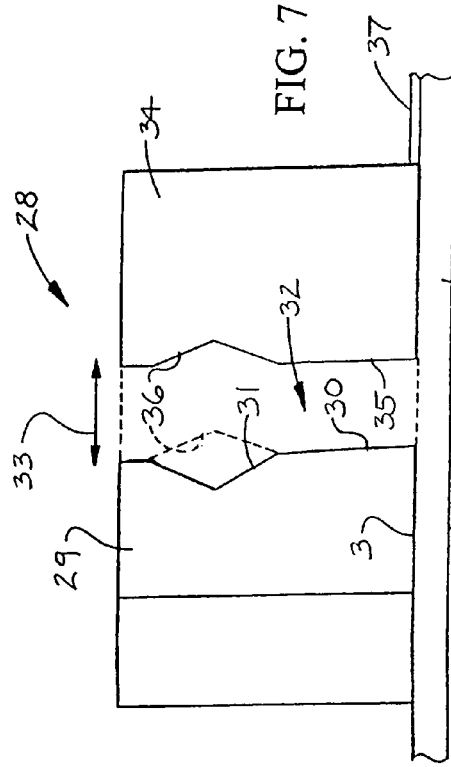
FIG. 7 is a side view of a stationary jaw and a movable jaw of a clamp jaw assembly, more particularly illustrating bidirectional movement capability of the movable jaw with respect to the stationary jaw.
Figure 8:
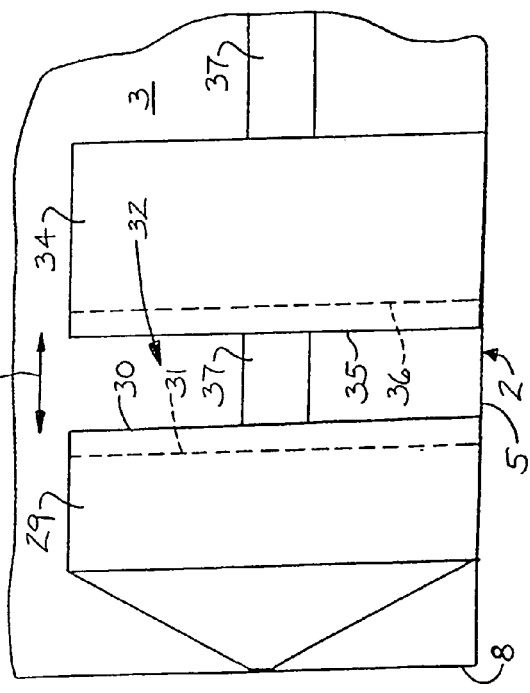
FIG. 8 is a top view of the stationary jaw and the movable jaw, more particularly illustrating bidirectional movement capability of the movable jaw with respect to the stationary jaw.

As further illustrated in FIGS. 7 and 8, the stationary jaw 29 may have a stationary jaw clamp surface 30. The movable jaw 34 may have a movable jaw clamp surface 35 which faces the stationary jaw clamp surface 30 of the stationary jaw 29. A generally elongated, V-shaped stationary clamp notch 31 is provided in the stationary jaw clamp surface 30 of the stationary jaw 29. A generally elongated, V-shaped movable clamp notch 36 is provided in the movable jaw clamp surface 35 of the movable jaw 34. Accordingly, when the movable jaw clamp surface 35 of the movable jaw 34 engages the stationary jaw clamp surface 30 of the stationary jaw 29, as illustrated in FIG. 2, the stationary clamp notch 31 of the stationary jaw 29 interfaces with the movable clamp notch 36 of the movable jaw 34. As illustrated in FIGS. 7 and 8, when the movable jaw 34 disengages the stationary jaw 29, a clamp space 32 is defined between the stationary jaw clamp surface 30 of the stationary jaw 29 and the movable jaw clamp surface 35 of the movable jaw 34.

As illustrated in FIGS. 1, 2, 4 and 5 of the drawings, a jaw actuation assembly 50 may be provided on the system frame 2 to facilitate selective movement of the stationary jaw 34 against and away form the stationary jaw 29 of the clamp jaw assembly 28. In some embodiments, the jaw actuation assembly 50 may include an elongated lead screw 51 having lead screw threads 52. A lead screw rotation wheel 53 may be provided on a first end of the lead screw 51. A second end of the lead screw 51 engages the movable jaw 34 of the clamp jaw assembly 28. The second end of the lead screw 51 may extend into a lead screw opening (not illustrated) provided in the movable jaw 34. A lead screw fastener 54 (FIG. 1) may be threaded through a fastener opening (not illustrated) provided in the movable jaw 34 and against the lead screw 51 to secure the lead screw 51 in the movable jaw 34.

Figure 6:
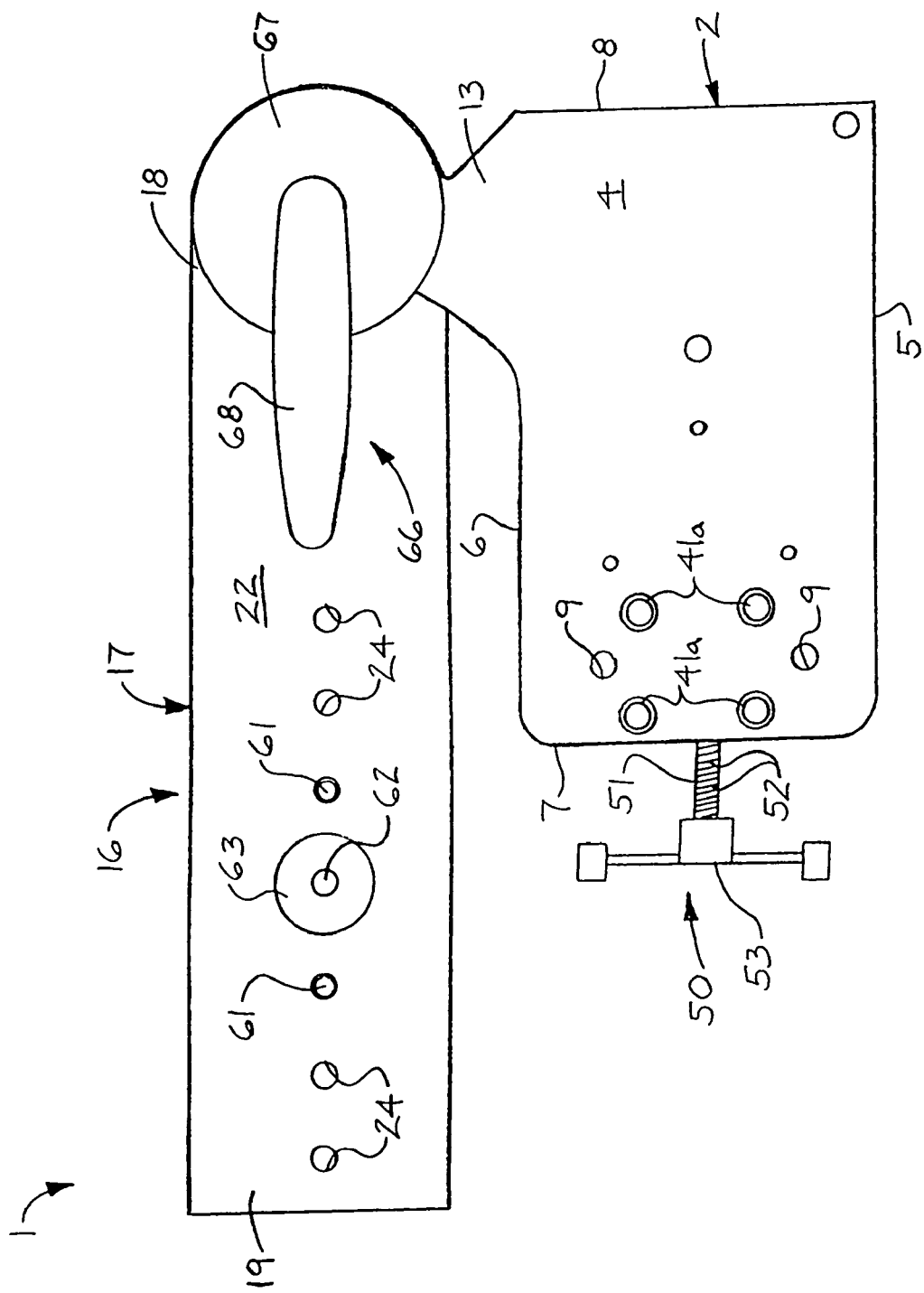
FIG. 6 is a bottom view of an illustrative embodiment of the tubular member notching system.
Figure 9:
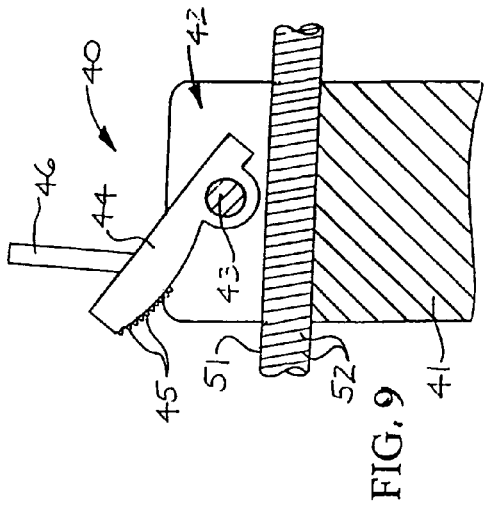
FIG. 9 is a sectional view, taken along FIGS. 9-9 in FIG. 1, of a lead screw anchor assembly, with an anchor arm of the lead screw anchor assembly disengaging a lead screw (shown in section)
Figure 10:
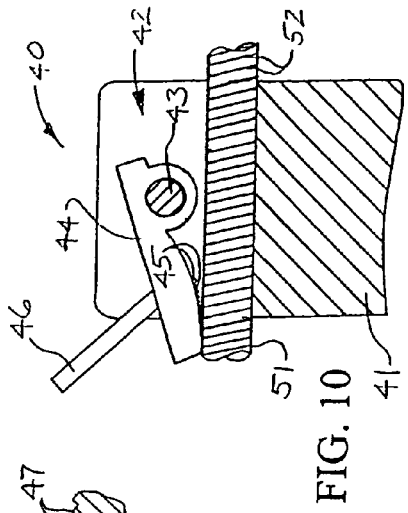
FIG. 10 is a sectional view, taken along FIGS. 9-9 in FIG. 1, of the lead screw anchor assembly, with the anchor arm of the lead screw anchor assembly engaging the lead screw (shown in section)
Figure 11:
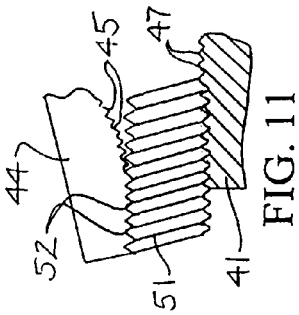
FIG. 11 is an enlarged sectional view illustrating multiple anchor teeth provided on the anchor arm engaging lead screw threads provided on the lead screw when the anchor arm is disposed in the lead screw-engaging position illustrated in FIG. 10.

The jaw actuation assembly 50 may further include a lead screw anchor assembly 40. The lead screw anchor assembly 40 includes an anchor mount 41 which extends from the upper frame surface 3 of the system frame 2 in spaced-apart relationship with respect to the movable jaw 34 of the clamp jaw assembly 28. As illustrated in FIG. 6, in some embodiments the anchor mount 41 may be attached to the system frame 2 using multiple anchor mount fasteners 41a which extend through respective anchor mount fastener openings (not illustrated) provided in the system frame 2 and are threaded into the anchor mount 41. As illustrated in FIGS. 9 and 10, an anchor slot 42 may be provided in the anchor mount 41. The lead screw 51 of the jaw actuation assembly 50 extends through the anchor slot 42. As illustrated in FIG. 11, anchor mount threads 47 may be provided in the anchor mount 41 inside the anchor slot 42. The lead screw threads 52 on the lead screw 51 may threadably engage the anchor mount threads 47, as further illustrated in FIG. 11. An anchor arm 44 is pivotally mounted in the anchor slot 42 of the anchor mount 41. In some embodiments, the anchor arm 44 may be pivotally mounted on an anchor flange mount rod 43 which extends transversely through the anchor slot 42. Anchor teeth 45 are provided on the anchor arm 44. Accordingly, the anchor arm 44 can be selectively disposed in the raised position 44 illustrated in FIG. 9, in which the anchor teeth 45 of the anchor arm 44 disengage the lead screw threads 52 on the lead screw 51, and the lowered position illustrated in FIGS. 10 and 11, in which the anchor teeth 45 of the anchor arm 44 engage the lead screw threads 52 on the lead screw 51. In some embodiments, an anchor rod 46 may extend from the anchor arm 44 to facilitate manipulation of the anchor arm 44 between the lowered and raised positions.

Referring next to FIGS. 14-31 and 35 of the drawings, in an exemplary application, the tubular member notching system 1 may be used to accurately and expeditiously cut at least one notch 94a, 95a in at least one end of an elongated tubular member 88 (FIGS. 20-23). As illustrated in FIG. 31, the tubular member 88 may be an elongated tubular connecting member which connects a pair of spaced-apart side tubular members 90 to each other. As will be hereinafter described, the tubular member notching system 1 may be operated to cut a first end notch 94a and a second end notch 95a in the respective ends of the tubular connecting member 88 at such an angle and size that the notches 94a, 95a are substantially congruent with and fit flush against the exterior surfaces of the respective side tubular members 90.

As illustrated in FIGS. 16-19A, an exemplary centerline indication collar 84 which may be used to mark the proper orientation for the second end notch 95a after cutting of the first end notch 94a in the tubular connecting member 88 is illustrated. The centerline indication collar 84 may include a generally semicircular collar body 85 which may be a flexible material. A center notch 86, which may be generally V-shaped, as illustrated in FIG. 18, is provided in an edge 85a of the collar body 85. A pair of side notches 87, each of which may be generally V-shaped, as illustrated in FIGS. 17 and 19, may additionally be provided in the edge 85a of the collar body 85. Each side notch 87 may be located at a 90-degree angle with respect to the center notch 86 along the arc of the collar body 85. The side notches 87 may be located in 180-degrees with respect to each other along the arc of the collar body 85.

In use, the system 1 may be mounted on any of a variety of surfaces (not illustrated). In some applications, the system 1 may be mounted on a workbench (not illustrated) according to attachment techniques which are well-known by those skilled in the art. In an exemplary application, the system 1 may be mounted on the left or right front corner of a workbench. In other applications, the system 1 may be mounted using a vise (not illustrated). In still other applications, a pedestal mount (not illustrated) may be used to mount the system 1. The pedestal mount application may facilitate omni-positioning capability of the swing arm 17 for optimum use. Once the system 1 is mounted, the swing arm 17 of the system 1 may be squared up using a square (not illustrated). This may be accomplished by positioning the swing arm 17 such that the degree indicator 25 (FIG. 1) points to the "zero degree" position of the angle markings 23. The swing arm locking assembly 66 (FIGS. 2-5) may be used to lock the swing arm 17 at the squared position such as in the manner which was heretofore described.

The arbor housing 59 of the arbor housing assembly 58 may be attached to the selected position along the swing arm 17 of the swing arm assembly 16, such as in the manner which was heretofore described with respect to FIGS. 12 and 13, and secured in position using the arbor housing attachment knob 63. A holesaw assembly 74 may be mounted on the swing arm 17. As illustrated in FIGS. 14 and 15, the holesaw assembly 74 may have a conventional design including an elongated holesaw shaft 76. A holesaw drive shaft 77 may terminate a proximal end of the holesaw shaft 76. The holesaw drive shaft 77 is drivingly engaged by a holesaw motor 75 (illustrated in phantom). A cutting head adaptor 78 may be provided on the extending or distal end of the holesaw shaft 76. The cutting head adaptor 78 may be adapted to drivingly engage a cylindrical cutting head 79 having a toothed or serrated cutting edge 80. The diameter of the cutting head 79 may be selected to match the desired size of the notch or notches 94a, 95a, respectively, which is to be cut in one or both ends of the tubular connecting member 88. The holesaw assembly 74 may be mounted on the swing arm 17 by extending the holesaw shaft 76 through the arbor bore 60 (illustrated in phantom in FIG. 25) of the arbor housing 59 with the cutting head 79 pointed generally toward the proximal end portion 18 of the swing arm 17, as illustrated in FIG. 25. The position of the arbor housing 59 on the swing arm 17 may be selected based on such considerations as the type, angle and size, for example and without limitation, of the notch or notches 94a, 95a which are to be cut in the tubular connecting member 88. As illustrated in FIG. 12, depending on factors such as the desired location of the notch or notches 94a, 95a in the tubular connecting member 88, it may be necessary in some applications to place one or multiple arbor housing shims 70 (illustrated in phantom) between the arbor housing 59 and the swing arm 17.

Figure 21:
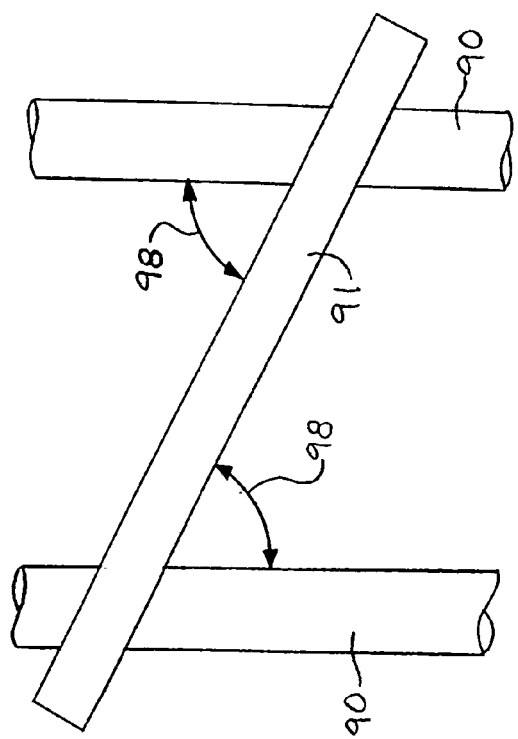
FIG. 21 is a front view of the tubular side members, with a tubular connecting member stock placed across the tubular side members for centerline marking of the tubular side members.
Figure 22:
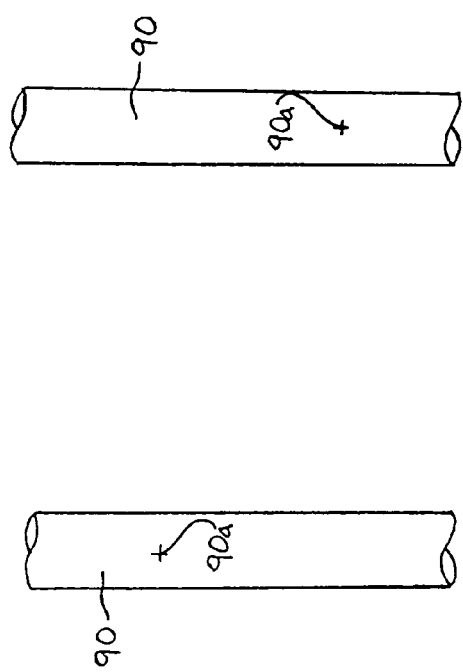
FIG. 22 is a front view of the tubular side members, with a centerpoint marked on each tubular side member to indicate the proposed points of attachment of the tubular connecting member to the respective tubular side members.

As illustrated in FIGS. 21 and 22, the tubular connecting member stock 91 may be placed across the side tubular members 90 and a centerpoint 90a marked on each side tubular member 90. Each centerpoint 90a may correspond to the proposed connection point between each end of the soon-to-be fabricated tubular connecting member 88 and the corresponding side tubular member 90. The distance between the centerpoints 90a on the respective side tubular members 90 may then be measured using a tape measure (not illustrated) or other suitable measuring device. Based on the measured distance between the marked centerpoints 90a, the length of tubing which will need to be cut from the tubular connecting member stock 91 to form a cut tubular connecting member stock 91a (FIG. 23) that will ultimately be used to fabricate the tubular connecting member 88 is determined. The length of tubing which will be cut from the tubular connecting member stock 91 may be estimated. In some applications, the length of tubing which will need to be cut from the tubular connecting member stock 91 to form the cut tubular connecting member stock 91a may be calculated using EASYNOTCH® software which is commercially available. As illustrated in FIG. 21, the small angle 98 which is defined between each side tubular member 90 and the tubular connecting member stock 91 may be noted.

Figure 23:
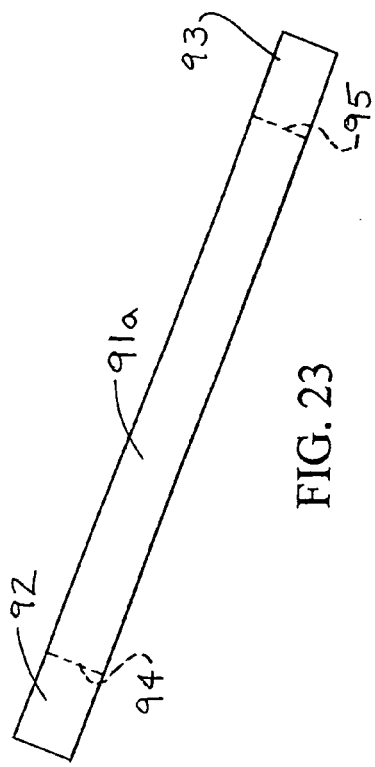
FIG. 23 is a side view of the tubular connecting member stock, more particularly illustrating cutting of the respective ends of the tubular connecting member stock to a length which corresponds to the distance between the centerpoints marked on the respective tubular side members illustrated in FIG. 22 preparatory to cutting notches in respective ends of the tubular connecting member.
Figure 20:
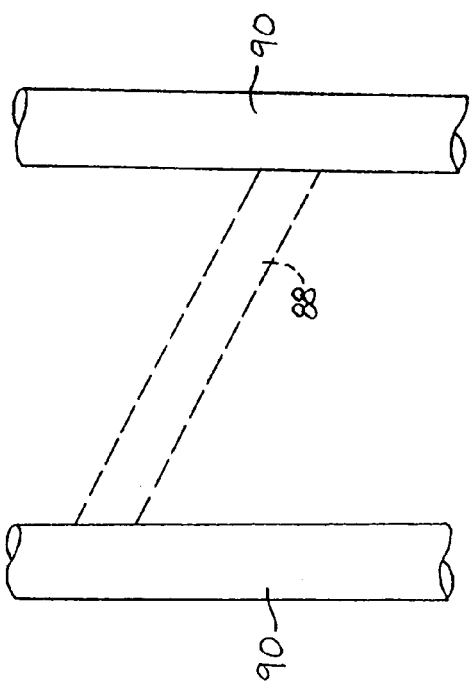
FIG. 20 is a front view of a pair of spaced-apart tubular side members, illustrating proposed attachment of the tubular side members with a diagonal or angled tubular connecting member (shown in phantom)

Next, as illustrated in FIG. 23, using conventional cutting or sawing techniques known by those skilled in the art, a first end portion 92 and a second end portion 93 may be cut from respective ends of the tubular connecting member stock 91 to define the cut tubular connecting member stock 91a having the calculated length for subsequent fabrication of the tubular connecting member 88. Accordingly, the cut tubular connecting member stock 91a may have a first end 94 and a second end 95 which are exposed by cutting of the first end portion 92 and the second end portion 93, respectively, from the tubular connecting member stock 91. The first end 94 and the second end 95 may be subjected to de-burring to remove burrs (not illustrated) from the first end 94 and the second end 95, respectively.

As illustrated in FIG. 25, the de-burred and cut tubular connecting member stock 91a may be placed in the clamp space 32 (FIG. 24) between the stationary jaw 29 and the movable jaw 34 of the clamp jaw assembly 28. Disengagement and separation of the movable jaw 34 from the fixed jaw 29 may be accomplished by first pivoting the anchor mount arm 44 of the lead screw anchor assembly 40 into engagement with the lead screw threads 52 of the lead screw 51, as illustrated in FIGS. 10 and 11, and then rotating the lead screw 52 typically in the counterclockwise direction by manipulation of the lead screw rotation wheel 53 (FIG. 5) of the jaw actuation assembly 50. The cut tubular connecting member stock 91a is then placed in the clamp space 32 and the movable jaw 34 advanced toward and then against the cut tubular connecting member stock 91a, as illustrated in FIG. 25, typically by clockwise rotation of the lead screw rotation wheel 53, until the cut tubular connecting member stock 91a is held between the stationary clamp notch 31 of the stationary jaw 29 and the movable clamp notch 36 of the movable jaw 34.

The swing arm 17 may be pivoted with respect to the swing arm attachment bolt 20 such that the degree indicator 25 (FIG. 24) points to the angle marking 23 which indicates the small angle 98 (FIG. 21) defined between each side tubular member 90 and the tubular connecting member stock 91 as was previously noted. The position of the cut tubular connecting member 91a may be adjusted in the clamp space 32 such that forward advancement of the cutting head 79 of the holesaw assembly 74 will be directed along a notch cut line 96 which corresponds to the position and angle of the first end notch 94a (FIG. 31) to be cut in the tubular connecting member 88. Next, the holesaw motor 75 may be operated to rotate the cutting head 79 through rotation of the holesaw drive shaft 77 as the holesaw shaft 76 is advanced through the arbor bore 60 of the arbor housing 59 and the cutting head 79 advanced toward and then against the cut tubular connecting member 91a along the notch cut line 96, as illustrated in FIGS. 26 and 27. Accordingly, the cutting head 79 cuts a first notch 94a (FIG. 31) in the first end 94 of the cut tubular connecting member 91a. The size and angle of the first notch 94a correspond to the diameter of the cutting head 79 and the angle which is indicated by the degree indicator 25 (FIG. 24) toward the angle markings 23 on the proximal end portion 18 of the swing arm 17, respectively.

After the first notch 94a is cut in the first end 94 of the cut tubular connecting member stock 91a, the cut tubular connecting member stock 91a is removed from the clamp space 32 between the stationary jaw 29 and the movable jaw 34 of the clamp jaw assembly 28, rotated 180 degrees and again secured in the clamp space 32 such that the second end 95 of the cut tubular connecting member stock 91a is positioned for cutting, as illustrated in FIG. 28. A centerline indication collar 84 (FIGS. 16-19A) may be fitted on the tubular connecting member stock 91a to indicate the centerline of the tubular connecting member stock 91a and also indicate the side of the tubular connecting member stock 91a in which the second end notch 95a is to be cut. Accordingly, the center notch 86 (FIG. 19A) of the centerline indication collar 84 may be aligned with the center of the first end notch 94a which was previously cut in the tubular connecting member stock 91a. Cutting of the second end notch 95a in the second end 95 of the cut tubular connecting member stock 91a may then be accomplished as was heretofore described with respect to cutting of the first end notch 94a in FIGS. 24-27. After cutting of the second end notch 95a in the cut tubular connecting member stock 91a, the tubular connecting member 88 may be welded between the side tubular members 90, as illustrated in FIG. 31, with the first end notch 94a and the second end notch 95a interfacing with the respective side tubular members 90.

It will be appreciated by those skilled in the art that the swing arm 17 of the swing arm assembly 16 is capable of 180-degree rotation about the swing arm attachment bolt 20 (FIG. 1). This renders possible the cutting of notches with greater angles and the cutting of notches on larger-diameter tubing than is possible using many conventional devices and methods.

Figure 35:
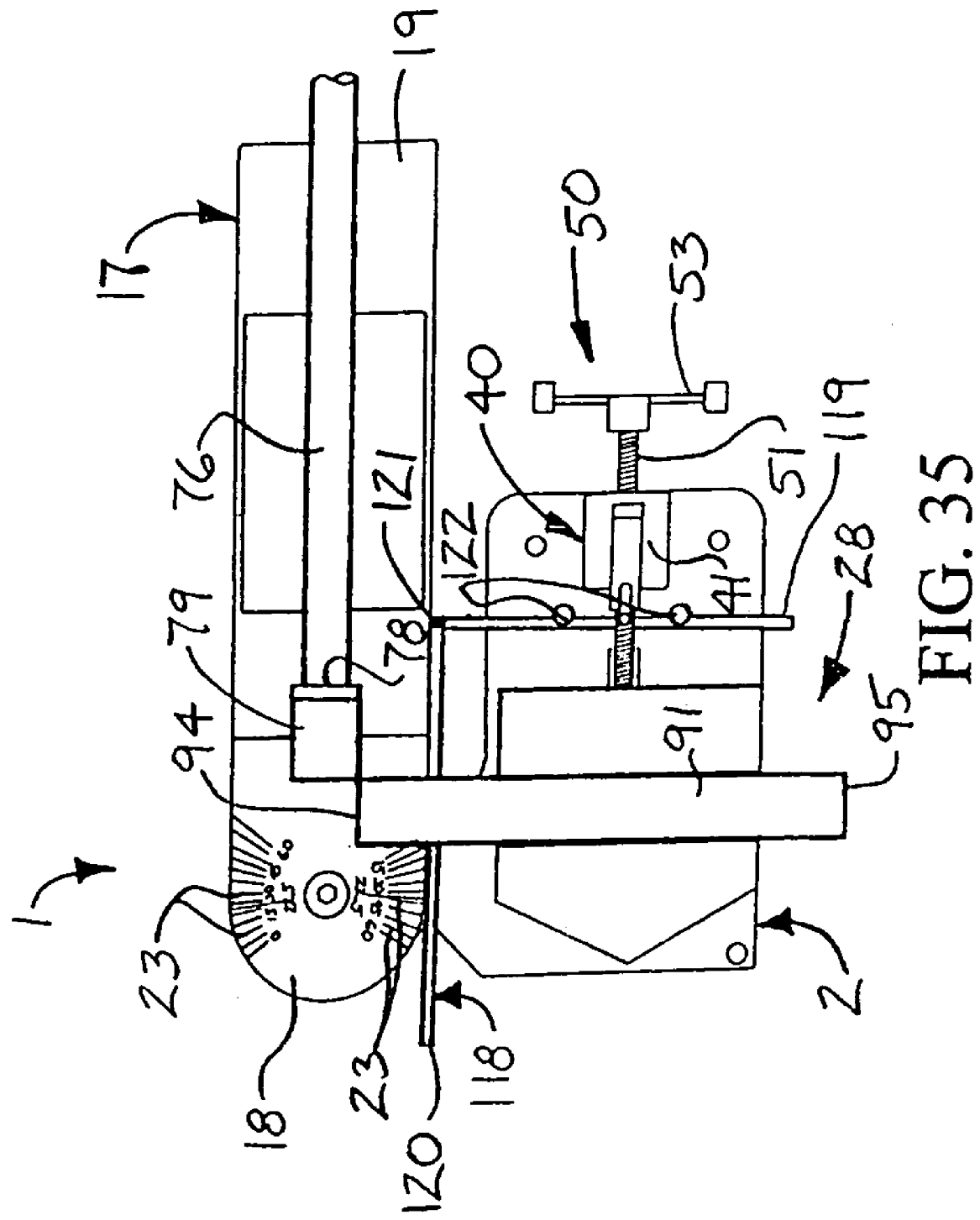
FIG. 35 is a top view of an illustrative embodiment of the tubular member notching system, illustrating placement of an arm stop jig for stopping of the swing arm at a selected cutting angle.

As illustrated in FIG. 35, in some applications the swing arm 17 may be stopped at the selected cutting angle with respect to the system frame 2 using an arm stop jig 118. The arm stop jig 118 may include a generally elongated secured jig arm 119 and a pivoting jig arm 120 which is pivotally attached to the secured jig arm 119 at an arm pivot 121. The secured jig arm 119 may be attached to the system frame 2 by securing the secured jig arm 119 between the upper frame surface 3 of the system frame 2 and a pair of jig securing fasteners 122 which are threaded into respective fastener openings 9 (FIG. 1) provided in the system frame 2. The pivoting jig arm 120 may be inserted between the degree indicator 25 (FIG. 1) and the swing arm 17. Accordingly, the swing arm 17 engages the pivoting jig arm 120, which acts as a "stop" and holds the swing arm 17 at the desired cutting angle.

Referring next to FIGS. 32-34 of the drawings, an illustrative embodiment of a centerline locating device 100 which may be used to locate the centerline of a tubular member 112 (FIG. 34), such as in implementation of the system 1, is illustrated. The centerline locating device 100 includes a device frame 101 which may have a generally U-shaped configuration. The device frame 101 may include a frame cross member 102 and a pair of generally elongated, parallel, spaced-apart frame arms 103 which extend from the frame cross member 102. A shaft opening 104 extends through the center of the frame cross member 102. A bushing (not illustrated) may extend through the shaft opening 104. A shaft 105 extends through the shaft bushing in the shaft opening 104. A retainer ring 111 may be provided on one end of the shaft 105 and the opposite end of the shaft 105 may be peined or swedged to prevent inadvertent movement of the shaft 105 from the shaft bushing and shaft opening 104. An engaging device 108, which may have a generally inverted V-shape, is slidably mounted on the shaft 105 between the frame arms 103 of the device frame 101. Accordingly, the engaging device 108 can be disposed at multiple positions along the shaft 105, as indicated in FIG. 33. The engaging device 108 may include a pair of engaging panels 109 which join at an apex 110 and are disposed at a generally 90-degree angle with respect to each other. At least one coiled spring 106 may be interposed between the engaging device 108 and the frame cross member 102 of the device frame 101 and normally biases the engaging device 108 to the lowermost position on the shaft 105.

As illustrated in FIGS. 33 and 34, in typical use of the centerline locating device 100, a tubular member 112, the centerline of which is to be located, may be placed on a supporting surface 114. The frame arms 103 of the device frame 101 may be placed on the supporting surface 114 on respective sides of the tubular member 112. The spring or springs 106 on the shaft 105 bias the engaging panels 109 of the engaging device 108 against the tubular member 112. Accordingly, the apex 110 of the engaging device 108 marks the location of the centerline of the tubular member 112. A pin or other marking implement (not illustrated) may be used to mark the location of the centerline on the surface of the tubular member 112 as indicated by the arrow 116. It will be appreciated by those skilled in the art that the multi-positioning capability of the engaging device 108 along the shaft 105 facilitates engagement of the engaging device 108 with tubular members 112 having various diameters.

Figure 36:
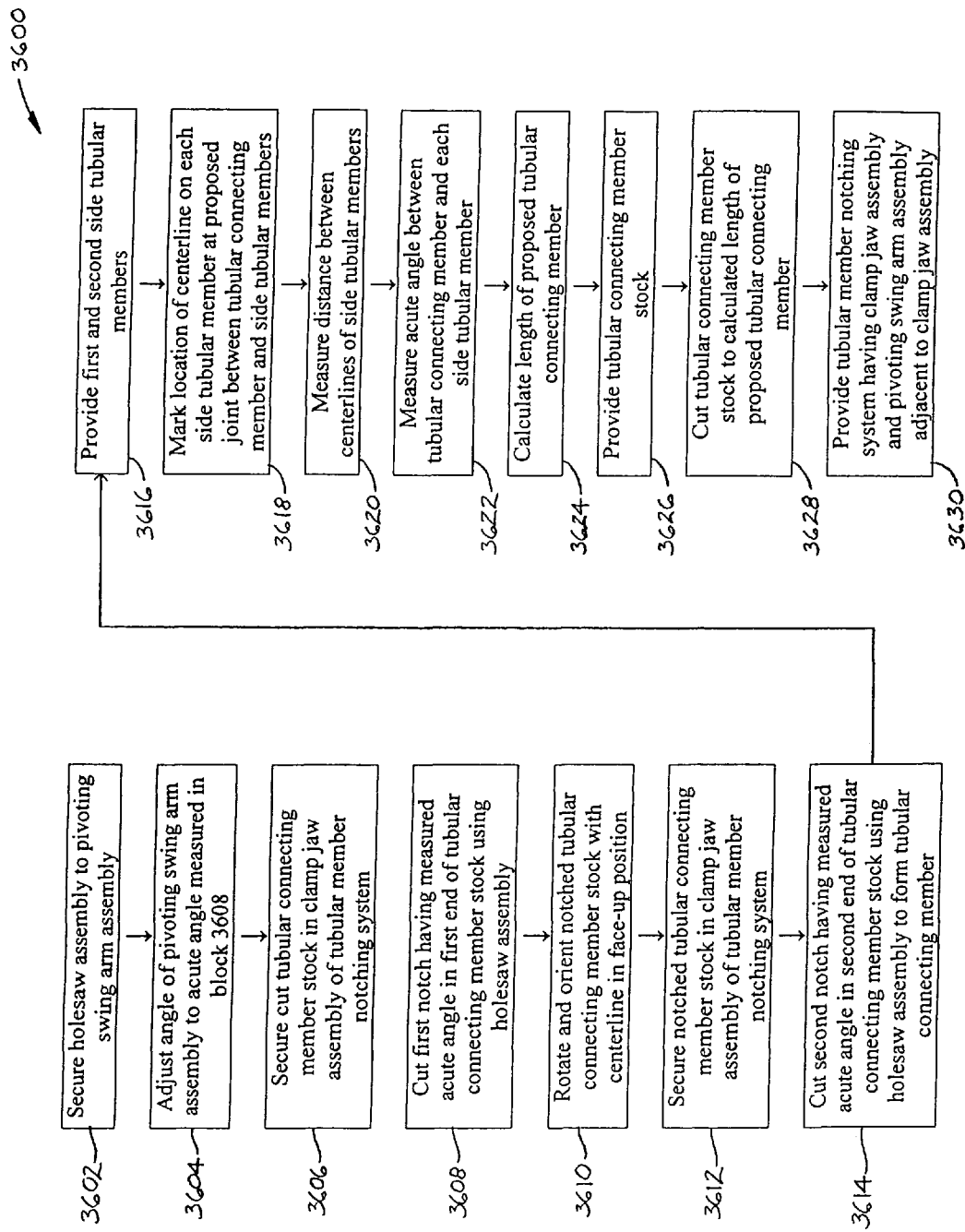
FIG. 36 is a flow diagram which illustrates an illustrative embodiment of a method of cutting a pair of in-plane notches in a tubular member.

Referring next to FIG. 36 of the drawings, a flow diagram 3600 which illustrates an illustrative embodiment of a method of cutting a pair of in-plane notches (notches which lie in the same plane) in a tubular member is illustrated. In block 3602, first and second side tubular members are provided. In block 3604, a centerline is located and marked on each side tubular member at the proposed joint between a tubular connecting member and each side tubular member. In block 3606, the distance between the centerlines on the side tubular members is measured. In block 3608, the acute angle between the tubular connecting member and each side tubular member is measured. In some applications, the angle between the tubular connecting member and each side tubular member may be 90 degrees. In block 3610, the length of the proposed tubular connecting member is calculated. In block 3612, a tubular connecting member stock is provided. In block 3614, the tubular connecting member stock is cut to the calculated length of the proposed tubular connecting member calculated in block 3610. In block 3616, a tubular member notching system having a clamp jaw assembly and a pivoting swing arm assembly adjacent to the clamp jaw assembly is provided. In block 3618, a holesaw assembly is secured to the pivoting swing arm assembly of the tubular member notching system. In block 3620, the angle of the pivoting swing arm assembly is adjusted to the acute angle which was measured in block 3608. In block 3622, the cut tubular connecting member stock is secured in the clamp jaw assembly of the tubular member notching system.

In block 3624, a first notch, having the acute angle which was measured in block 3608, is cut in the first end of the tubular connecting member stock according to the calculated distance setback measured from the end of the tube. In block 3626, the notched tubular connecting member stock is removed from the clamp jaw assembly and rotated and oriented with the centerline of the tubular connecting member stock in the face-up position. In block 3628, the notched tubular connecting member stock is again secured in the clamp jaw assembly of the tubular member notching system. In block 3630, a second notch having the acute angle which was measured in block 3608 is cut in the second end of the tubular connecting member stock according to the calculated distance setback measured from the end of the tube using the holesaw assembly to form the tubular connecting member. In subsequent steps, each notch may be dressed as necessary to remove any burrs or jagged edges. The first and second notches may then be placed against the first and second side tubular members, respectively, and the tubular connecting member may be welded and/or otherwise attached to the first and second side tubular members.

Figure 37:
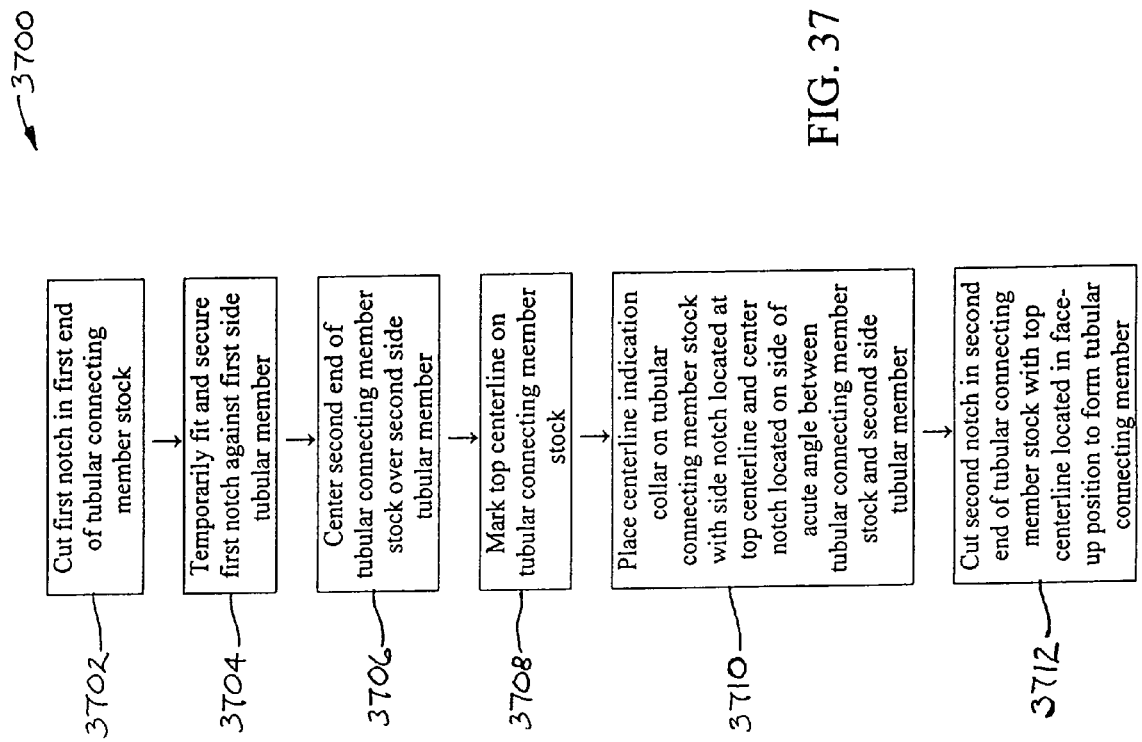
FIG. 37 is a flow diagram which illustrates an illustrative embodiment of a method of cutting a pair of out-of-plane notches in a tubular member.

Referring next to FIG. 37 of the drawings, a flow diagram 3700 which illustrates an illustrative embodiment of a method of cutting a pair of out-of-plane notches (notches which lie in different planes) in a tubular member is illustrated. In block 3702, a first notch is cut in a first end of a tubular connecting member stock according to the calculated distance setback measured from the end of the tube. This step may be preceded by blocks 3602-3622 which were heretofore described with respect to FIG. 36. In block 3704, the first notch which was cut in the first end of the tubular connecting member stock in block 3702 is temporarily fit and secured against the first side tubular member. In block 3706, the second end of the tubular connecting member stock is centered over the second side tubular member. In block 3708, a top centerline is marked on the tubular connecting member stock. In block 3710, a centerline indication collar (FIGS. 16-19A) may be placed on the tubular connecting member stock with the side notch of the collar located at the top centerline of the tubular connecting member and the center notch of the collar located on the side of the acute angle between the tubular connecting member stock and the second side tubular member. In block 3712, a second notch is cut in the second end of the tubular connecting member stock according to the calculated distance setback measured from the end of the tube with the top centerline located in a face-up position. This step forms the tubular connecting member. In subsequent steps, each notch may be dressed as necessary to remove any burrs or jagged edges. The first and second notches may then placed against the first and second side tubular members, respectively, and the tubular connecting member may be welded and/or otherwise attached to the first and second side tubular members.

While the preferred embodiments of the disclosure have been described above, it will be recognized and understood that various modifications can be made and the appended claims are intended to cover all such modifications which may fall within the spirit and scope of the disclosure.

I claim:

1. A tubular member notching system, comprising:
   a system frame;
   a clamp jaw assembly carried by the system frame;
   a jaw actuation assembly carried by the system frame and engaging the clamp jaw assembly, wherein the jaw actuation assembly comprises a lead screw anchor assembly carried by the system frame and a lead screw carried by the lead screw anchor assembly and engaging the clamp jaw assembly;
   a pivoting swing arm assembly positioned generally alongside the system frame adjacent to the clamp jaw assembly; and
   an arbor housing assembly carried by the pivoting swing arm assembly.

2. The system of claim 1 wherein the system frame comprises a generally elongated, rectangular frame plate.

3. The system of claim 1 wherein the clamp jaw assembly comprises a stationary jaw and a movable jaw movable with respect to the stationary jaw, and wherein the jaw actuation assembly engages the movable jaw.

4. The system of claim 3 further comprising a stationary jaw clamp notch provided in the stationary jaw and a movable jaw clamp notch provided in the movable jaw.

5. The system of claim 3 further comprising a jaw track provided on the system frame and wherein the movable jaw slidably engages the jaw track.

6. The system of claim 1 wherein the lead screw anchor assembly comprises an anchor mount carried by the system frame, an anchor slot provided in the anchor mount and receiving the lead screw and an anchor arm pivotally carried by the anchor mount in the anchor slot and detachably engaging the lead screw.

7. The system of claim 1 wherein the pivoting swing arm assembly comprises a base attachment arm extending from the system frame, a swing arm mount base carried by the base attachment arm and a swing arm pivotally carried by the swing arm mount base.

8. A tubular member notching system, comprising:
   a system frame;
   a clamp jaw assembly having a stationary jaw carried by the system frame and a movable jaw carried by the system frame and movable with respect to the stationary jaw;
   a jaw actuation assembly having a lead screw anchor assembly carried by the system frame and a lead screw carried by the lead screw anchor assembly and engaging the movable jaw of the clamp jaw assembly;
   a pivoting swing arm assembly having a swing arm pivotally carried by and positioned generally alongside the system frame generally adjacent to the clamp jaw assembly; and
   an arbor housing assembly carried by the pivoting swing arm assembly.

9. The system of claim 8 further comprising a generally V-shaped stationary jaw clamp notch provided in the stationary jaw and a generally V-shaped movable jaw clamp notch provided in the movable jaw.

10. The system of claim 8 further comprising a jaw track provided on the system frame and wherein the movable jaw slidably engages the jaw track.

11. The system of claim 8 wherein the lead screw anchor assembly comprises an anchor mount carried by the system frame, an anchor slot provided in the anchor mount and receiving the lead screw and an anchor arm pivotally carried by the anchor mount in the anchor slot and detachably engaging the lead screw.

12. The system of claim 8 wherein the arbor housing assembly comprises a plurality of arbor housing mount openings provided in the swing arm, an arbor housing having an arbor bore, an arbor housing mount bolt extending from the arbor housing and inserted through one of the plurality of arbor housing mount openings and an arbor housing attachment knob threaded on the arbor housing mount bolt.

13. The system of claim 12 further comprising a pair of spaced-apart arbor housing guide pegs extending from the arbor housing and inserted through a pair of the plurality of arbor housing mount openings, respectively.

14. The system of claim 8 further comprising a degree indicator carried by the system frame and a plurality of angle markings provided on the swing arm generally adjacent to the degree indicator.

15. A tubular member notching system, comprising:
   a system frame;
   a clamp jaw assembly having a stationary jaw carried by the system frame and a movable jaw carried by the system frame and movable with respect to the stationary jaw;
   a jaw actuation assembly having a lead screw anchor assembly carried by the system frame and a lead screw carried by the lead screw anchor assembly and engaging the movable jaw of the clamp jaw assembly;
   a pivoting swing arm assembly having a swing arm mount base extending from the system frame and a swing arm pivotally carried by the swing arm mount base and positioned generally alongside the system frame generally adjacent to the clamp jaw assembly;
   a swing arm locking assembly carried by the swing arm assembly and engaging the swing arm; and an arbor housing assembly carried by the pivoting swing arm assembly and having a plurality of arbor housing mount openings provided in the swing arm, an arbor housing having an arbor bore, an arbor housing mount bolt extending from the arbor housing and inserted through one of the plurality of arbor housing mount openings and an arbor housing attachment knob threaded on the arbor housing mount bolt.

16. The system of claim 15 wherein the lead screw anchor assembly comprises an anchor mount carried by the system frame, an anchor slot provided in the anchor mount and receiving the lead screw and an anchor arm pivotally carried by the anchor mount in the anchor slot and detachably engaging the lead screw.

17. The system of claim 15 further comprising a pair of spaced-apart arbor housing guide pegs extending from the arbor housing and inserted through a pair of the plurality of arbor housing mount openings, respectively.

18. The system of claim 15 further comprising a degree indicator carried by the system frame and a plurality of angle markings provided on the swing arm generally adjacent to the degree indicator.

19. The system of claim 15 wherein the swing arm locking assembly comprises an arm lock plate carried by the swing arm mount base and an arm lock knob carried by the arm lock plate and engaging the swing arm.

* * * * *